(12) United States Patent
Babak

(10) Patent No.: US 6,402,447 B1
(45) Date of Patent: Jun. 11, 2002

(54) CONNECTION BOLT FOR REPEATED TIGHTENING BEYOND YIELD POINT

(75) Inventor: Jan Babak, Mlada Boleslav (CZ)

(73) Assignee: Skoda Auto A.S. (CZ)

( * ) Notice: Subject to any disclaimer, the term of this patent is extended or adjusted under 35 U.S.C. 154(b) by 0 days.

(21) Appl. No.: 09/602,359

(22) Filed: Jun. 22, 2000

(30) Foreign Application Priority Data

Jun. 22, 1999 (CS) .............................. 2286-99

(51) Int. Cl.[7] ............................ F16B 3/102; F16B 35/04
(52) U.S. Cl. ............................ 411/14; 411/411; 411/424
(58) Field of Search ............................ 411/8, 13, 14, 411/411, 424; 285/93

(56) References Cited

U.S. PATENT DOCUMENTS

| | | | | |
|---|---|---|---|---|
| 4,317,585 A | * | 3/1982 | Boice | 411/14 X |
| 4,338,054 A | * | 7/1982 | Dahl | 411/8 X |

FOREIGN PATENT DOCUMENTS

| | | | | |
|---|---|---|---|---|
| SU | 1541438 | * | 2/1990 | 411/14 |
| WO | 9108398 | | 6/1991 | 31/2 |
| WO | 9203665 | | 3/1992 | 31/2 |
| WO | 9729288 | | 8/1997 | 31/2 |
| WO | 9802667 | | 1/1998 | 31/2 |
| WO | 9909327 | | 2/1999 | 31/2 |

* cited by examiner

Primary Examiner—Neill Wilson
(74) Attorney, Agent, or Firm—Ostrolenk, Faber, Gerb & Soffen, LLP

(57) ABSTRACT

A connection bolt (1) for repeated tightening beyond yield point which bolt (1) comprises a head (2) and a shank which shank is provided with a thread, whereby said head (2) of said connection bolt (1) is provided with at least one indication mark (9) at a fixed defined mutual angle position to at least one indication sign (10), which sign (10) is provided on the free shank (5) end relative to the axis (q—q) of the bolt (1) rotation. This system of marking allows to determine the damage of said bolt (1) exactly and to decide about further ability of said bolt (1) to be used next time without any risk of destruction or decrease in quality of a joint.

16 Claims, 3 Drawing Sheets

CONNECTION BOLT FOR REPEATED TIGHTENING BEYOND YIELD POINT

FIELD OF THE INVENTION

The present invention relates to a connection bolt for repeated tightening beyond yield point provided with means making possible to determine the degree of damage by permanent deformations, whereby, the deformations are a criterion for their further serviceability.

BACKGROUND OF THE INVENTION

At present, connection bolts are tightened up to the threshold of their yield point with the minimum risk of a damage very carefully, but costly, using an electronic device applying the gradient method. Then, the bolts are further applicable, but only for the first time there is a full certainty because usually such a device is available only at the producer premises during the first assembly.

But there are also more available methods of tightening connection bolts up to their yield point. Such methods use a control by the angle of rotation, eventually by the number of impulses of a tightening spindle, but at the cost of certain results scattering, including a random risk that most of them will be over-tightened beyond the yield point what could lead to a partial bolt material damage in such a bolt by permanent deformations.

In spite of that both above mentioned methods of connection bolt tightening guarantee the advantage of using their strength up to 100% during one case of their tightening and reaching of their maximum possible pre-stressing within a narrow scattering range, whereby, they represent the most advanced methods in the art at present, they exhibit an essential costs weakness. The weakness consists in that because of inherent uncertainty in the process of storing information about partial damage of said bolts regarding their tightening beyond their yield point they have to be replaced after each disassembly to meet the quality demands. A paradox is that because of that the connection bolts are a part for one use only. Consequently, this substantially adds to the costs of an overhaul, repair, assembly of disassembled products and service maintenance. The present unavailability of the option of a repeated assembly without a replacement of said bolts prevents a more frequent application of said advanced tightening method in practice.

The prior art comprises also a method of connection bolt damage evaluation which method consists in that the permanent bolt elongation is used as a criterion for the plastic deformation of said bolts. But the problem is that this indicator is not explicit enough and that it is necessary to keep records about the original length of each bolt individually, what is inoperable in an industrial use. Therefore, this method is useful only for a general optical selection of evidently elongated bolts exhibiting a visible contraction of their critical cross section. Similar and even greater disadvantages exhibits also the other method used which method consists in evaluating length elongation only of the threaded part of the bolt shank.

Where a top quality is the priority in the production process, considering the above described uncertainty, in day-to-day practice, preferably, all otherwise highly valuable disassembled connection bolts are discarded whenever there is a suspicion that the yield point was exceeded. But mostly they are still quite well applicable. Thereby, substantial financial losses are caused in spite of that in theory such losses are not necessary from the technical point of view. Considering the above, it is an object of the present invention to provide a method of suitable and explicit system of marking said bolts enabling a reliable indication of the extent of the permanent deformations.

SUMMARY OF THE INVENTION

The above mentioned disadvantages of the prior art methods are removed by a connection bolt for repeated tightening beyond yield point which bolt comprises a head and a shank which shank is provided with a thread, according to this invention, whereby said head is provided with at least one indication mark at a fixed defined mutual angle position to at least one indication sign, which sign is provided on the free shank end relative to the axis of bolt rotation. Said indication mark and said indication sign are formed by at least one three-dimensional integral or interrupted groove or projection which groove or projection are formed in the material of said connection bolt. Perpendicular lines dropped from the centres of said indication marks or signs to the bolt rotation axis q—q form reference axes a—a or c—c of the respective indication system which reference axes together with said bolt rotation axis q—q define the actual mutual angle position of a head reference plane $\alpha$ and a bolt shank free end reference plane $\chi$. In case that, considering a special symmetric configuration of indication marks or signs, their centre falls directly into the bolt axis q—q, preferably one of other symmetry axes in the system of indication marks or signs, situated in the plane perpendicular to the bolt rotation axis q—q, may be chosen as the reference axis. In case of the connection bolt embodiment which is provided with a guiding tip, the indication sign of the shank free end is formed by at least one flattening or concave surface formed on the guiding nose in radial direction with regard to the connection bolt axis q—q. In case of an embodiment provided with a short cylindrical or conical guiding nose, the indication sign is situated on the face of the free end of the shank and formed by a full-length or interrupted groove or projection. The indication mark and the indication sign, provided already in the production of said connection bolt, determine the angle $\Delta\theta_H$ of permanent torsion of said connection bolt shank by a change of their mutual angle positions, which mutual angle is represented by an angle $\theta_H$ of the reference planes $\alpha$ and $\chi$ after a bolt tightening beyond the yield point, and said indication mark and said indication sign make said angle $\Delta\theta_H$ of permanent torsion visible and measurable. Surface of said indication mark and said indication sign is protected so as the other parts of said connection bolt at least by an equally effective protective layer.

The indication marks and signs serve, either directly as a contact for a device for reading the actual positions in the system of indication marks in the area of said head and of those of the indication signs at the bolt shank free end or in a combination with the gripping surfaces of said head or flattening of said guiding end, as orientation optical marks that make possible to read correctly the size of the respectively defined angle $\theta_H$ of said planes $\alpha$ and $\chi$ in the desired size range. In case, it is necessary to use the entire theoretically possible angle $\theta_H$ size range from 0° to 360°, this requirement can be met e.g. by an intentionally unsymmetric configuration of the figures of said indication marks and signs.

BRIEF DESCRIPTION OF THE DRAWINGS

The invention will be further illustrated with reference to the attached drawings, whereby.

DETAILED DESCRIPTION OF THE INVENTION

Figure 1:
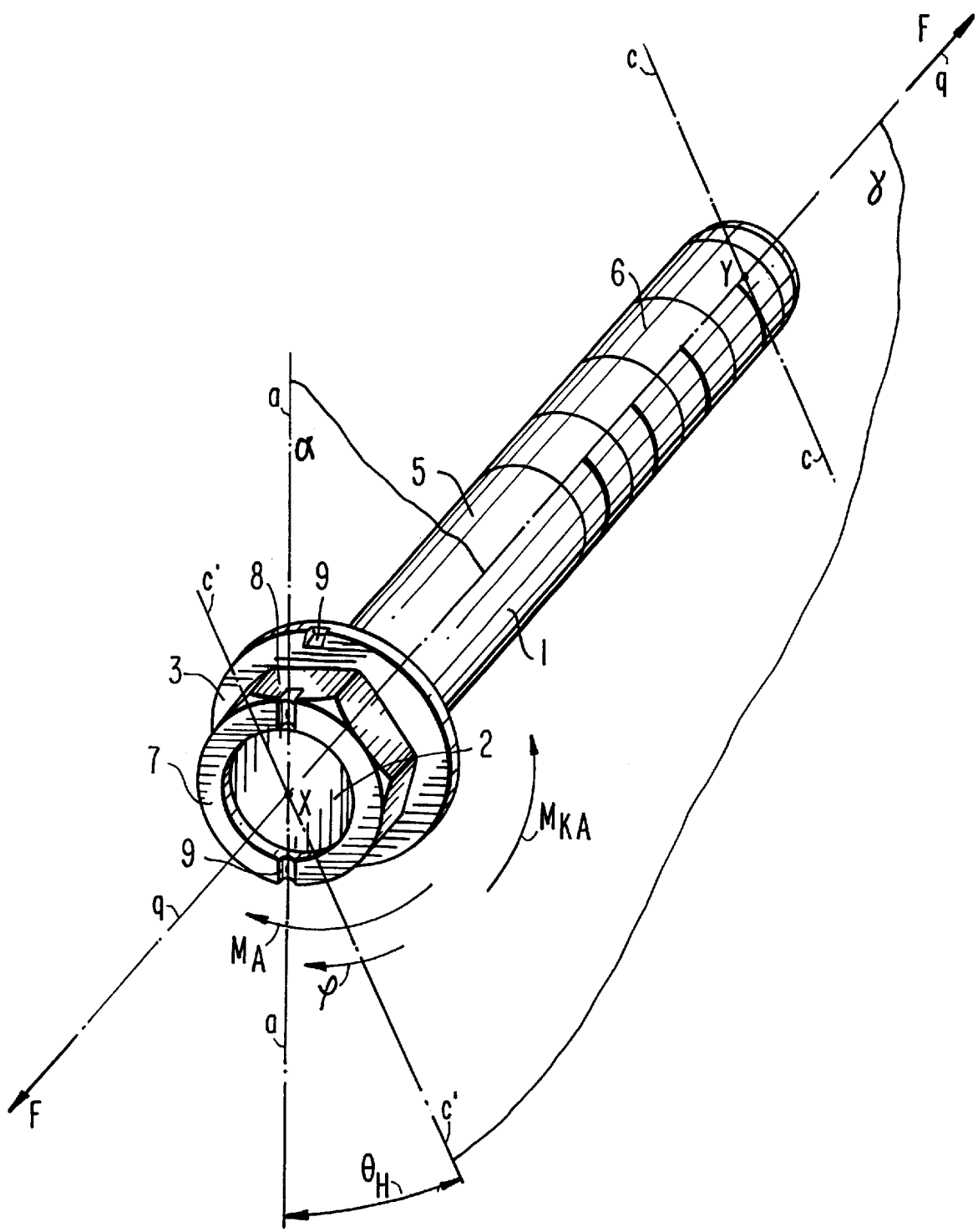
FIG. 1 is a perspective view of one embodiment of the connection bolt showing the bolt head in the proximate position.
Figure 2:
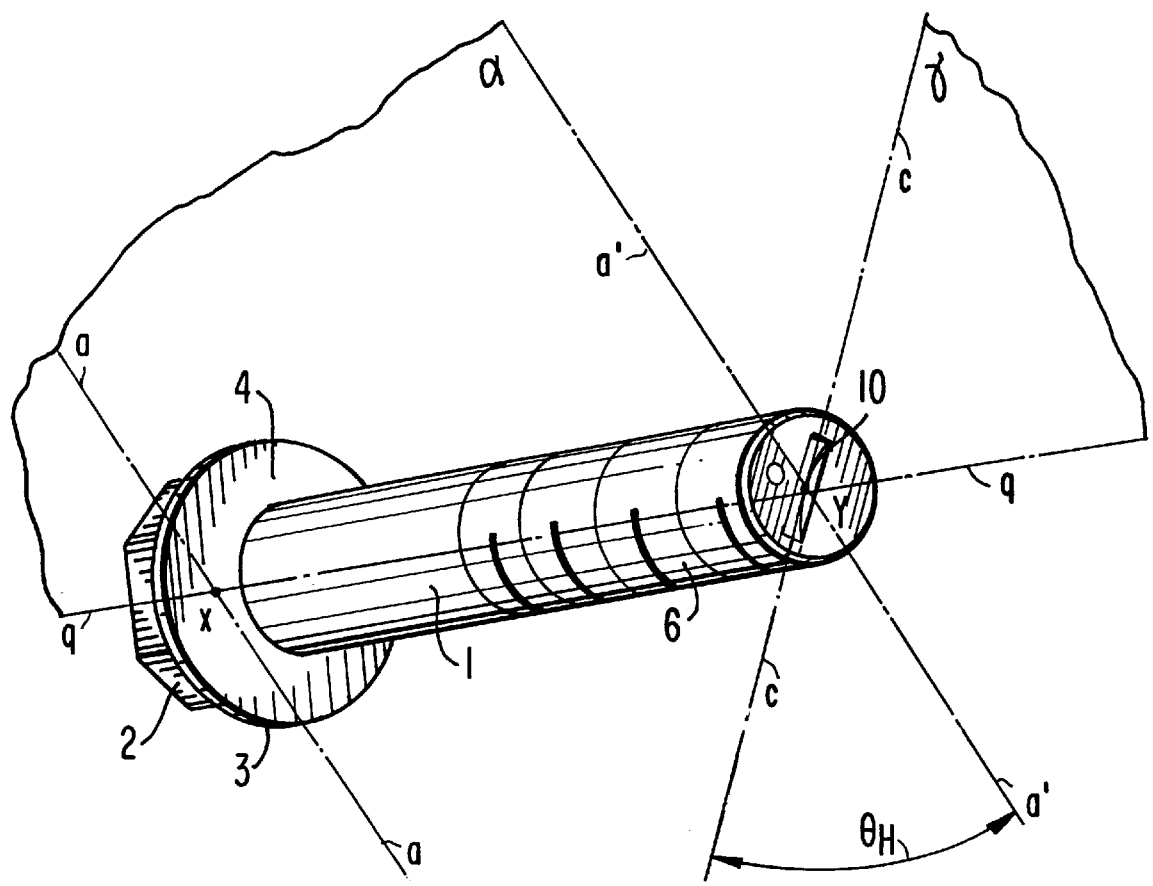
FIG. 2 is a perspective view of the same embodiment of the connection bolt showing the bolt shank loose end in the proximate position.
Figure 3:
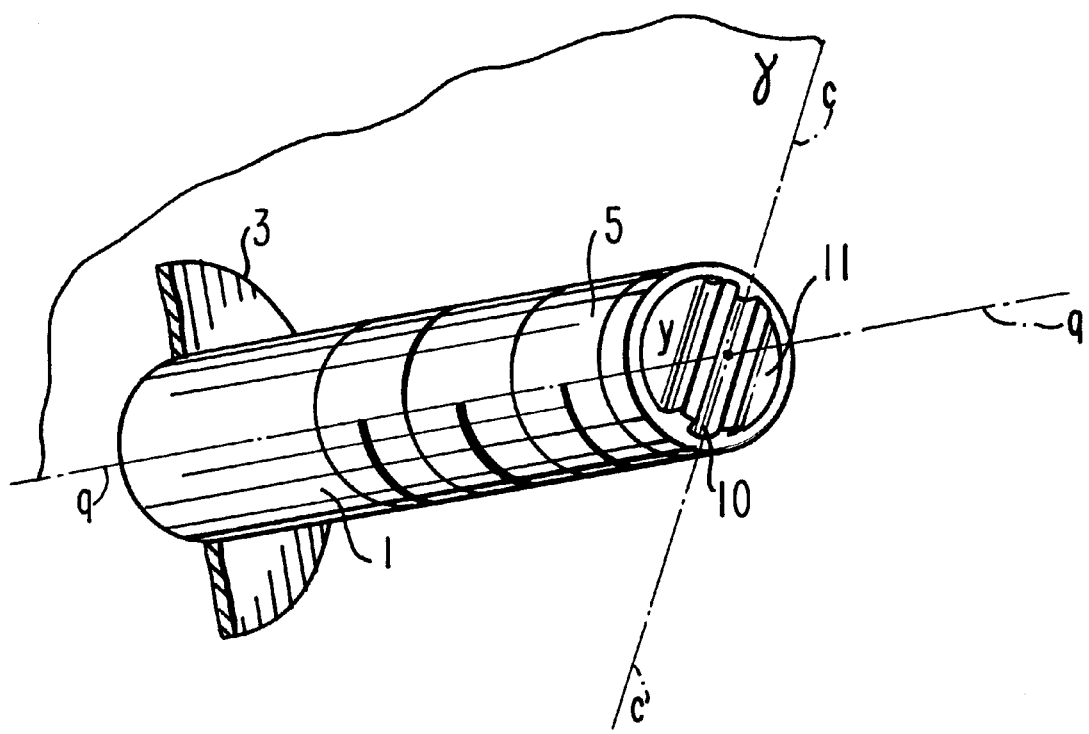
FIGS. 3 and 4 show perspective views of two other embodiments of the bolt shank loose end.
Figure 4:
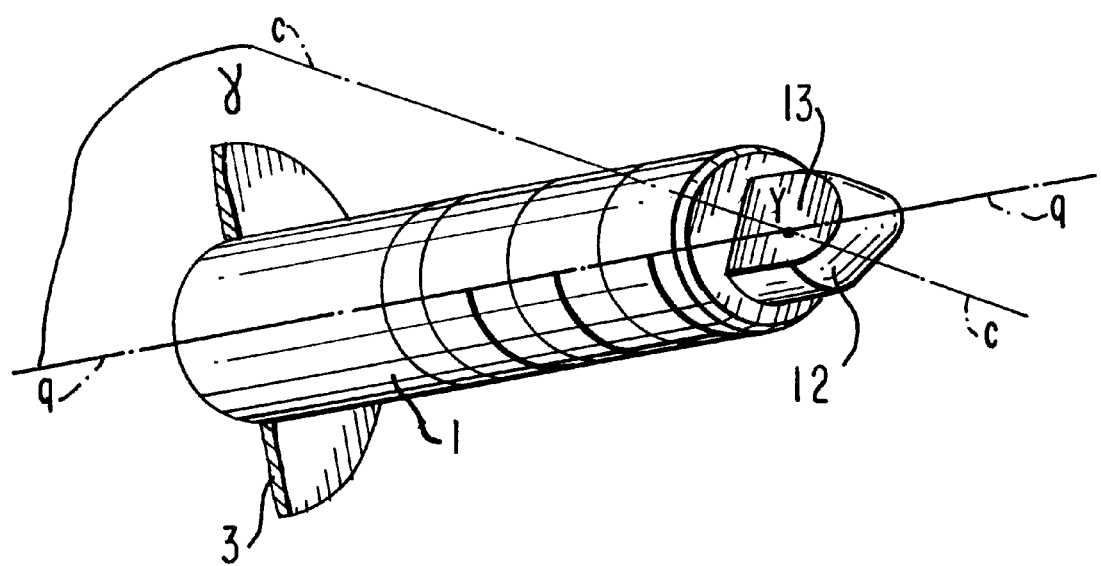

In a particularly preferred embodiment of the present invention, the connection bolt 1 applicable for repeated tightening beyond the yield point comprises a head 2 with a gripping means 7 and with an integral collar 3 with a contact surface 4, and a shank 5 provided with a thread 6.

Above the contact surface 4 of the head 2, on the side surface 8 of the head 2, optionally on the top surface, in an unloaded place of the gripping means 7, e.g. of the external hexagonal prism, eventually also on the integral collar 3 at least one three-dimensional concave or convex indication mark 9 is formed. At least one three-dimensional indication sign 10, situated preferably outside the thread 6, is formed on the surface of the shank 5 end at the place of a blunt guiding nose 11 of the bolt 1. This indication sign 10, placed at the end of the shank 5, similarly as the indication mark 9 on the head 2 or on the integral collar 3 is, in this case, formed by an integral or interrupted prolonged symmetric groove or protrusion. The paired indication mark 9 is preferably situated so that a perpendicular line dropped from the centre of both these parts to the axis q—q of the bolt 1 with the foot X conflux into one line representing the reference axis of the system of indication marks a—a. On the other side the centre of an integral indication sign 10 situated directly on the rotation axis q—q of the bolt 1 already is confluent with a point Y, which in the general configuration of the indication sign, was only derived as the foot of the respective perpendicular. In this case, a symmetry axis of the system, which is situated in the plane perpendicular to the bolt axis q—q, is preferably selected as the reference axis of the system of indication sign, e.g. the line c—c. The term centre of an indication sign or of an indication mark means the centre of symmetry of their convex and above the main body added or concave and from the main bolt body taken material. For a proper reading of the angle $\Delta\theta_H$ of permanent torsion of the shank 5 within the whole range up to the possible 360°, the indication system can be optionally situated asymmetrically.

In case of bolts 1 with a guiding tip 12 on the loose end of the shank 5 of the connection bolt 1, e.g. the angle-oriented flattening 13 can serve as an indication sign, which flattering 13 is formed outside the thread 6. The indication mark 9, as well as the indication sign 10 on the bolt 1 serve for reading of the actual angle $\theta_H$ of the reference planes $\alpha$ and $\chi$ defining mutual angle positions of the contact surface 4 of the head 2 and the plane of the free end face of its shank 5 around the bolt rotation axis q—q. This angle $\theta_H$ of the reference planes $\alpha$ and $\chi$ intersecting right in the axis q—q of the bolt 1 is geometrically defined in a known way as an angle either of concurrent lines a—a and ć—ć with an intersection in the point X or of concurrent lines á—á and in point Y, whereby, the auxiliary lines á—á and ć-ć are the respective parallel lines with the reference axes of the opposite indication system. The respective angle $\theta_H$ has to be specified twice in the accompanying documentation, e.g. in the instruction for use. At first as the initial angle $\theta_{HO}$, at best, if it is technologically feasible, as the zero angle and then also as. the maximum angle $\theta_{H\ MAX}$ allowed for the respective joint. If this maximum angle $\theta_{H\ MAX}$ is exceeded, it is a signal to replace the bolt for a new one. A bolt of the described design is tightened in accordance with the respective instructions. After it is disassembled it is assessed whether it can be re-used, whereby, the criterion of further use is the actually determined size of the angle $\theta_H$ of the indication system and the therefrom derived angle of permanent deformation in torsion $\Delta\theta_H = \Delta\theta_H - \theta_{HO}$. The bolt can be re-used at the original conditions of tightening in accordance with the rules unless the maximum allowed permanent angle of deformation in torsion of the bolt shank so as specified in the assembly instructions is reached.

The invention principle is based on knowledge of the stress modes in a bolt in practice. It is known that during tightening of a bolt 1 in the direction $\phi$, the critical part under the contact surface 4 of the head 2 and simultaneously that above the screwed in part of the shank 5 are exposed to a combined stress tension caused by axial pre-stressing force F exerted by wedge effect of the threads and torsion tension caused by the tightening moment $M_A$ less the friction moment $M_{KA}$ under the head. Therefore, a tightening of a bolt is a gradual increase of the combined stress of its shank by tension and torsion what causes also the respective shank deformations, i.e. both its elongation and torsion. Up to the yield point the deformations are elastic, reversible and cannot be found on a bolt after it is made loose. But beyond the yield point the increments of both deformations are plastic and permanent. Exceeding of the material yield point during the bolt tightening is manifested both by permanent elongation and permanent torsion of the shank. Such changes can be measured on a disassembled bolt and can be serve as an objective criterion of its tightening beyond the yield point both qualitatively and quantitatively.

The advantages of the system according to this invention are as follows:

An objective and reliable information about the tightening history commencing with the bolt production and covering the whole period of bolt use with regard to stressing the bolt by tightening it beyond the yield point is available.

According to this invention the extent of damage can be determined by the damage indicator according to this invention which makes the extent of the bolt permanent torsion easily detectable. The extent of the actual bolt plastic damage is indicated and can be used to decide about further use of the respective bolt.

According to this invention, there is not any fixed number of repeated assemblies of the bolts. This number is flexible according to individual conditions of a specific joint up to the full exhaustion of the remaining strength potential.

Thereby, further use of such bolt, tightened beyond its yield point is possible and it is not detrimental to quality or an undesired compromise in this field. As a consequence of the ability to check the bolt damage extent permanently, it is possible to presume that quality of a joint is improved. The indication system is totally reliable because it operates automatically without any risk of a human factor failure, without any time demand with regard to the operation staff and the damage extent information is accumulated spontaneously up to the full life expectancy.

The system makes a multiple hundred per cent use of bolts possible, what is a substantial costs saving. The saving is based on a repeated and up to the limit use of bolt material at each tightening beyond the yield point and also on mobilising all individual reserves of all kind given by the scattering of individual tightening characteristics, dimension tolerances and material properties of every bolt lot.

The marking system is permanent, cannot be wiped of during the whole bolt service and cannot damaged the proper individual surface treatment neither chemically nor mechanically.

An increase of bolt weight or price is not assumed. The bolts can be provided with the marking according the invention during the normal manufacturing unit operations in the forming machines so that only the costs of the necessary periodic replacement of production tools and costs are of gauges are caused and they are minimal in a mass production.

A confusion with e.g. a production marking of the tightened essentially significant bolts is not possible.

The possibilities of common and necessary operations with regard to the production quality and the tools and instruments used, including the applicability of the prescribed tightening procedure remain unaffected.

The damage indicator is environmentally friendly, because it makes a re-use of the bolts possible without a destruction risk, whereby, such the respective bolts are now discarded only because there is a suspicion that their yield point was exceeded and that they were damaged by permanent deformation. The Indication system according to this invention is not an environmental burden as it does not require any energy, paints or thinners.

New possibilities in design of economical products are provided.

The indication marks on a bolt substantially facilitate inspection of the respective bolt joints both in the preproduction phase and in the quality control during manufacturing or successively in emergencies and accidents when they contribute to a rapid finding the inducing relations.

INDUSTRIAL USE

The present invention will find uses in all traditional bolt joints where the bolt is intentionally the bottle neck of the assembly. Therefore, it is not applicable e.g. in cases of screws used to join wood, metal sheets, thermoplastic materials or in cases where there is a disproportion between the bolt and the nut regarding the combination of materials used. It is assumed that the bolt is of a sufficient design length with regard to the unscrewed length to allow that it can be tightened beyond its yield point.

What is claimed is:

1. A connection bolt for repeated tightening beyond yield point which bolt comprises a head and a shank which shank is provided with a thread, characterised in that said head of said connection bolt is provided with at least one indication mark at a fixed defined mutual angle position to at least one indication sign, which sign is provided on the free shank end relative to the axis of the bolt.

2. A connection bolt of claim 1, characterised in that said indication mark and said indication sign are formed by at least one three-dimensional integral or interrupted groove or projection which groove or projection are formed in the material of said connection bolt in the direction of the symmetry axes or situated in the plane perpendicular to the rotation axis of said bolt outside the thread.

3. A connection bolt of claim 1, characterised in that said connection bolt is provided with a guiding tip and said indication sign of said shank free end is formed by at least one flattening or a concave groove formed o the guiding nose formed in the radial direction with regard to the connection bolt axis.

4. A connection bolt of claim 1, characterised in that said connection bolt is provided with a short cylindrical or conical guiding nose and said indication sign is situated on the face of said free end of said shank and is formed by a full-length or interrupted groove or projection.

5. A connection bolt of claim 1 characterised in that said indication mark and said indication sign determining the angle ($\Delta\theta_H$) of permanent torsion of said connection bolt shank, making a visualisation and measurability possible, are originating from the bolt manufacturing and that said indication mark and said indication sign are surface protected.

6. A connection bolt of claim 1 characterised in that at least one indication mark is in a fixed defined angle position with regard to at least one side surface of a gripping means of said bolt head with regard to said axis of rotation.

7. A connection bolt of claim 2, characterized in that said indication mark and said indication sign determining the angle ($\Delta\theta_H$) of permanent torsion of said connection bolt shank, making a visualization and measurability possible, are originating from the bolt manufacturing and that said indication mark and said indication sign are surface protected.

8. A connection bolt of claim 3, characterized in that said indication mark and said indication sign determining the angle ($\Delta\theta_H$) of permanent torsion of said connection bolt shank, making a visualization and measurability possible, are originating from the bolt manufacturing and that said indication mark and said indication sign are surface protected.

9. A connection bolt of claim 4, characterized in that said indication mark and said indication sign determining the angle ($\Delta\theta_H$) of permanent torsion of said connection bolt shank, making a visualization and measurability possible, are originating from the bolt manufacturing and that said indication mark and said indication sign are surface protected.

10. A connection bolt of claim 2, characterized in that at least one indication mark is in a fixed defined angle position with regard to at least one side surface of a gripping means of said bolt head with regard to said axis of rotation (q—q).

11. A connection bolt of claim 3, characterized in that at least one indication mark is in a fixed defined angle position with regard to at least one side surface of a gripping means of said bolt head with regard to said axis of rotation (q—q).

12. A connection bolt of claim 4, characterized in that at least one indication mark is in a fixed defined angle position with regard to at least one side surface of a gripping means of said bolt head with regard to said axis of rotation (q—q).

13. A connection bolt of claim 5, characterized in that at least one indication mark is in a fixed defined angle position with regard to at least one side surface of a gripping means of said bolt head with regard to said axis of rotation (q—q).

14. A connection bolt of claim 7, characterized in that at least one indication mark is in a fixed defined angle position with regard to at least one side surface of a gripping means of said bolt head with regard to said axis of rotation (q—q).

15. A connection bolt of claim 8, characterized in that at least one indication mark is in a fixed defined angle position with regard to at least one side surface of a gripping means of said bolt head with regard to said axis of rotation (q—q).

16. A connection bolt of claim 9, characterized in that at least one indication mark is in a fixed defined angle position with regard to at least one side surface of a gripping means of said bolt head with regard to said axis of rotation (q—q).

* * * * *